(12) United States Patent
Song et al.

(10) Patent No.: US 9,293,164 B2
(45) Date of Patent: Mar. 22, 2016

(54) SYSTEMS AND METHODS FOR ENERGY BASED HEAD CONTACT DETECTION

(71) Applicant: LSI Corporation, San Jose, CA (US)

(72) Inventors: Xiufeng Song, San Jose, CA (US); Richard Rauschmayer, Longmont, CO (US)

(73) Assignee: Avago Technologies General IP (Singapore) Pte. Ltd. (SG)

( * ) Notice: Subject to any disclaimer, the term of this patent is extended or adjusted under 35 U.S.C. 154(b) by 0 days.

(21) Appl. No.: 13/894,680

(22) Filed: May 15, 2013

(65) Prior Publication Data

US 2014/0334278 A1 Nov. 13, 2014

Related U.S. Application Data

(60) Provisional application No. 61/822,125, filed on May 10, 2013.

(51) Int. Cl.
*G11B 5/127* (2006.01)
*G11B 5/60* (2006.01)

(52) U.S. Cl.
CPC .............. *G11B 5/6076* (2013.01); *G11B 5/607* (2013.01)

(58) Field of Classification Search
CPC ............................... G11B 5/6076; G11B 5/607
USPC ................ 360/31, 75, 125.3, 125.31, 125.32, 360/125.71, 125.74, 125.75, 128
See application file for complete search history.

(56) References Cited

U.S. PATENT DOCUMENTS

| | | | |
|---|---|---|---|
| 4,715,257 A | 12/1987 | Hoshiai et al. | |
| 4,777,544 A | 10/1988 | Brown et al. | |
| 5,086,475 A | 2/1992 | Kutaragi et al. | |
| 5,111,727 A | 5/1992 | Rossum | |
| 5,377,058 A | 12/1994 | Good et al. | |
| 5,814,750 A | 9/1998 | Wang et al. | |
| 6,097,559 A | 8/2000 | Ottensen | |
| 6,191,901 B1 | 2/2001 | Carlson | |
| 6,519,102 B1 | 2/2003 | Smith et al. | |
| 6,937,424 B2 | 8/2005 | Chang et al. | |
| 7,016,131 B2 | 3/2006 | Liu et al. | |
| 7,038,875 B2 | 5/2006 | Lou et al. | |
| 7,158,325 B1 | 1/2007 | Hu et al. | |
| 7,222,289 B2 | 5/2007 | Hung | |
| 7,796,356 B1 * | 9/2010 | Fowler et al. | 360/75 |
| 7,830,369 B2 | 11/2010 | Kageyama et al. | |
| 8,098,451 B2 | 1/2012 | Graef | |
| 8,145,443 B2 | 3/2012 | Kang et al. | |

(Continued)

FOREIGN PATENT DOCUMENTS

| | | |
|---|---|---|
| EP | 2031759 | 3/2004 |
| WO | WO 02/093546 | 11/2002 |
| WO | WO 2010/014078 | 2/2010 |

OTHER PUBLICATIONS

Fertner, Antoni "Frequency-Domain Echo Canceller With Phase Adjustment" IEEE Transactions on circuits and Systems—II; Analog and Digital Signal Processing, V. 44, No. 10, Oct. 9.

(Continued)

*Primary Examiner* — Gustavo Polo

(57) ABSTRACT

The present inventions are related to systems and methods for determining contact between two elements, and more particularly to systems and methods for determining contact between a head assembly and a storage medium.

20 Claims, 6 Drawing Sheets

(56) References Cited

U.S. PATENT DOCUMENTS

| | | |
|---|---|---|
| 8,296,638 B2 | 10/2012 | Derras |
| 8,300,349 B2 | 10/2012 | Mathew |
| 2007/0268615 A1 | 11/2007 | McFadyen et al. |
| 2008/0071367 A1 | 3/2008 | Bergin |
| 2008/0192379 A1 | 8/2008 | Kurita |
| 2012/0033323 A1 | 2/2012 | Mathew |
| 2012/0038998 A1 | 2/2012 | Mathew |
| 2012/0056612 A1 | 3/2012 | Mathew |
| 2012/0087035 A1 | 4/2012 | Graef |
| 2014/0002920 A1* | 1/2014 | Jin et al. .......... 360/53 |

OTHER PUBLICATIONS

Liu, et al., "Head Disk Spacing Variation Suppression via Active Flying Height Control" IEEE Instrumentation and Measurement Technology Conf. Budapest, Hungary May 21-23, 2001.

U.S. Appl. No. 13/537,487, Unpublished, filed Jun. 29, 2012 (Ming Jin).

U.S. Appl. No. 13/185,562, Unpublished, filed Jul. 19, 2011 (Haitao Xia).

\* cited by examiner

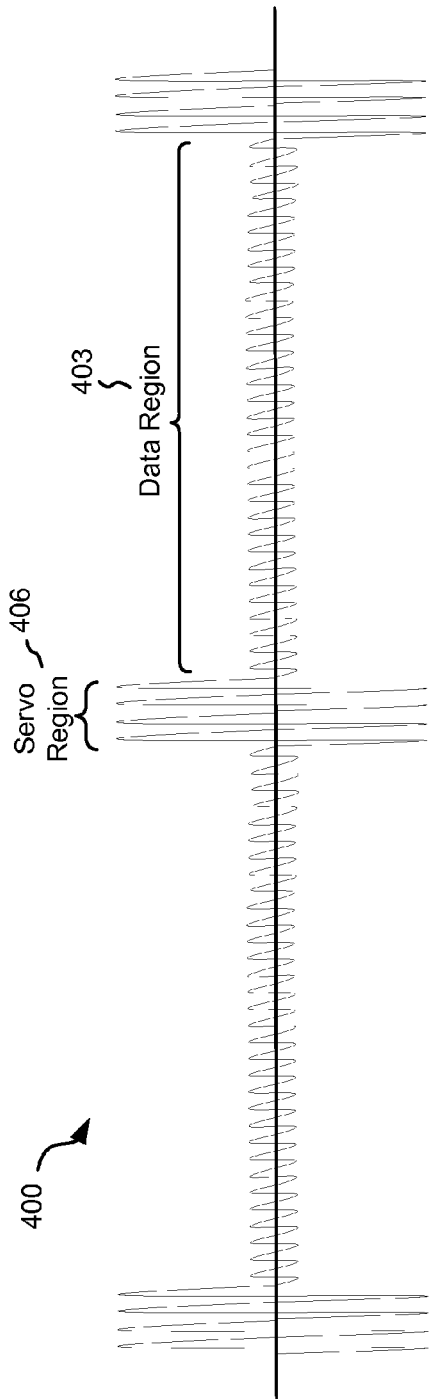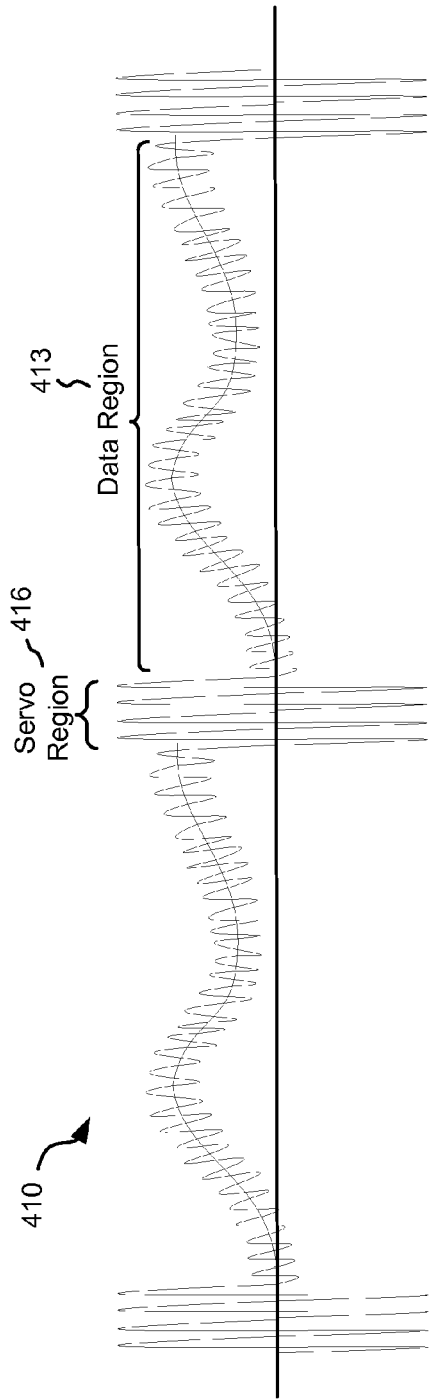

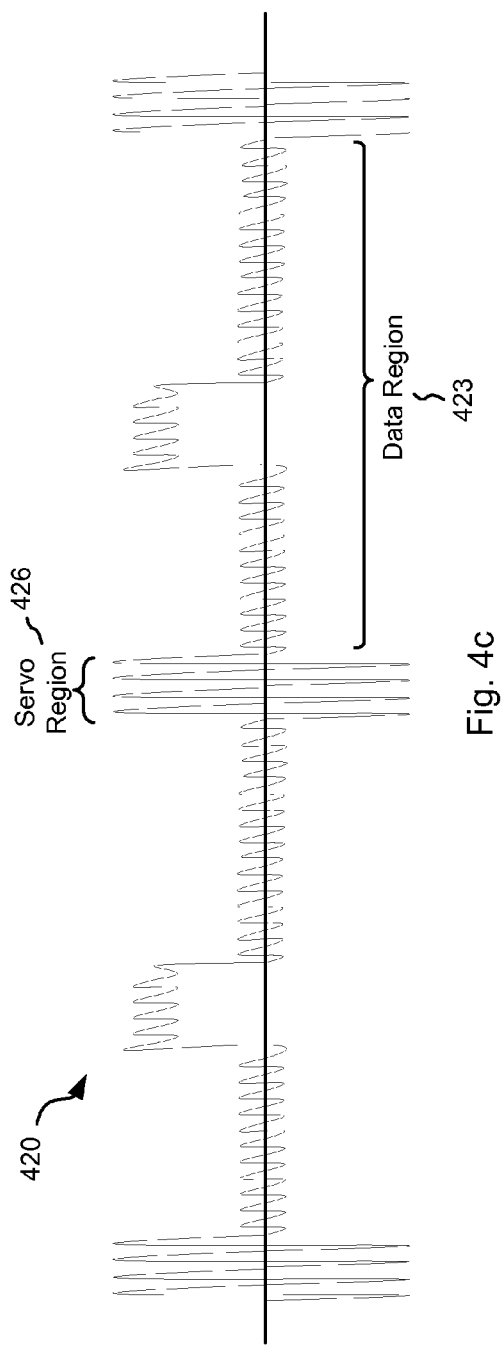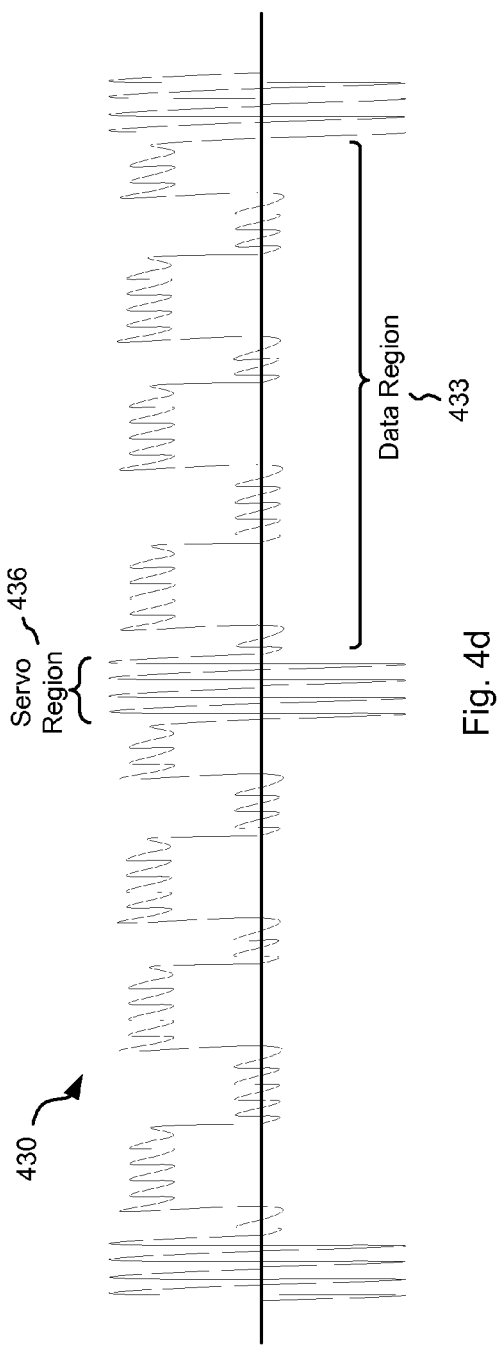

SYSTEMS AND METHODS FOR ENERGY BASED HEAD CONTACT DETECTION

CROSS REFERENCE TO RELATED APPLICATION

The present application claims priority to U.S. Pat. App. No. 61/822,125 entitled "Systems and Methods for Energy Based Head Contact Detection" and filed on May 10, 2013 by Song et al. The entirety of each of the aforementioned reference is incorporated herein by reference for all purposes.

FIELD OF THE INVENTION

The present inventions are related to systems and methods for determining contact between two elements, and more particularly to systems and methods for determining contact between a head assembly and a storage medium.

BACKGROUND

Typical implementations of hard disk based storage devices utilize a thermal element to control the fly height of the read/write head. Heating the thermal element causes a distance between the read/write head and a storage medium to decrease. Where the heat generated by the thermal element is sufficient, the read/write head may be brought into contact with the storage medium. In some cases, this contact can damage one or more components of the storage device.

Hence, for at least the aforementioned reason, there exists a need in the art for advanced systems and methods for determining contact between the read/write head and the storage medium.

BRIEF SUMMARY

The present inventions are related to systems and methods for determining contact between two elements, and more particularly to systems and methods for determining contact between a head assembly and a storage medium.

Various embodiments of the present invention provide storage devices that include: a storage medium, a read/write head assembly disposed in relation to the storage medium, and a touch down detection circuit. The read/write head assembly includes a sensor operable to provide a sensor output indicating contact between the read/write head assembly and the storage medium. The touch down detection circuit is operable to compare an energy value of the sensor output with a threshold value to yield a contact output.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIGS. 4a-4d graphically depict example signal outputs from a head disk interface sensor that vary as a function of the amount of contact between the read/write head assembly and the surface of the storage medium.

DETAILED DESCRIPTION OF THE INVENTION

Figure 1:
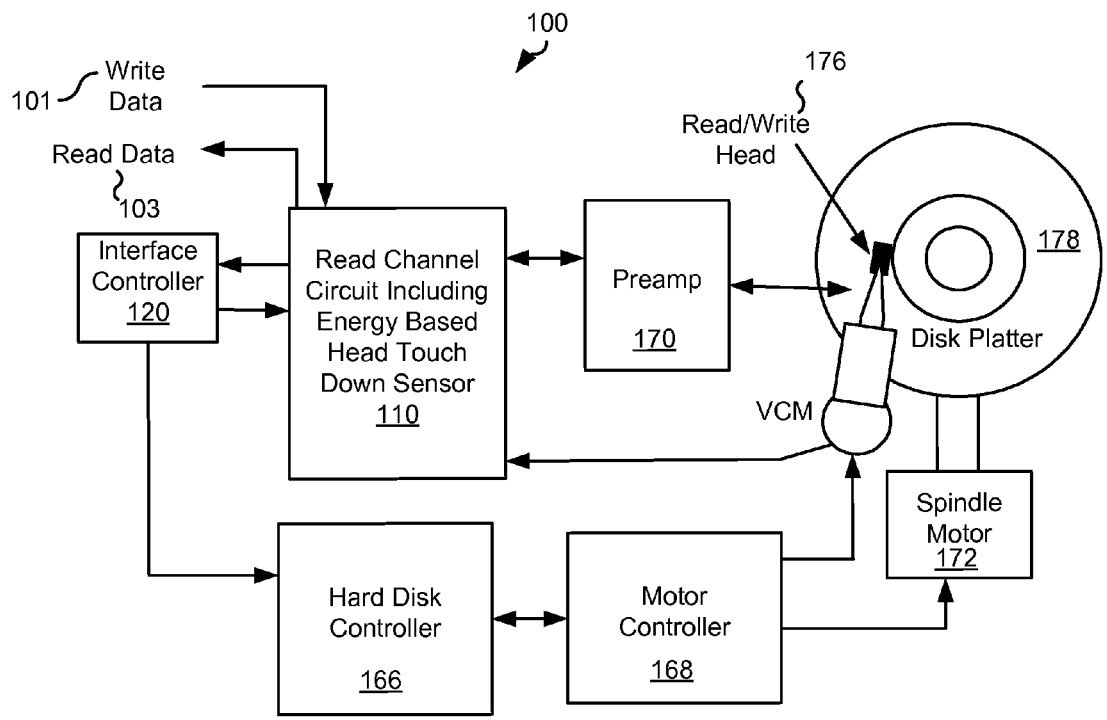
FIG. 1 shows a storage system including a read channel circuit having energy based head touch down sensor circuitry in accordance with various embodiments of the present invention.

The present inventions are related to systems and methods for determining contact between two elements, and more particularly to systems and methods for determining contact between a head assembly and a storage medium.

A hard disk interface ("HDI") sensor is included in the read/write head assembly. As the read/write head assembly flies close to the storage medium, a resonance is generated in the mechanical system including the read/write head assembly. This resonance may be used for touch down detection and in some systems a resonance detector has been employed to detect contact or touch down. However, utilization of such a resonance detector has some drawbacks including a relatively large number of parameters that must be characterized and controlled. As an example, a resonance detector may include four parameters: threshold, windows length, windows interval, and down sampling rate. These parameters are mutually dependent, and contact detection performance depends on all of the parameters. Determination of a contact detection threshold is inexact and therefore difficult to select. Further, use of such resonance detection requires knowledge of an approximate resonance frequency.

Various embodiments of the present invention utilize an energy based approach for contact determination. In such embodiments, an energy of the HDI signal is calculated, and a detectable increase in the energy level is used to characterize contact between a read/write head assembly and a storage medium. In particular embodiments of the present invention, detection is a binary output with one binary value indicating contact and the other binary value indicating a normal (i.e., non-contact) condition. In some cases, a threshold value is calculated based at least in part on a mean and variance of the HDI signal. In particular cases, the threshold value is further calculated based upon a threshold for false alarms provided from a user.

Various embodiments of the present invention provide storage devices that include: a storage medium, a read/write head assembly disposed in relation to the storage medium, and a touch down detection circuit. The read/write head assembly includes a sensor operable to provide a sensor output indicating contact between the read/write head assembly and the storage medium. The touch down detection circuit is operable to compare an energy value of the sensor output with a threshold value to yield a contact output. In some instances of the aforementioned embodiments, the sensor is a thermal sensor, and the sensor output corresponds to a temperature of the thermal sensor. In various cases, the touch down detection circuit is implemented as part of a semiconductor device. In one or more cases, the storage device is a hard disk drive.

In some instances of the aforementioned embodiments, the touch down detection circuit includes a threshold determination circuit. The threshold determination circuit may be operable to receive a user performance input, and to calculate the threshold value based at least in part on the user performance threshold. In various cases, the threshold determination circuit may be operable to calculate the threshold value based at least in part on a mean and variance of the sensor output. In particular cases, the threshold determination circuit may be operable to calculate the threshold value based on a combination of two or more of the mean of the sensor output, the variance of the sensor output, and the user performance threshold. In one or more instances of the aforementioned embodiments, the energy calculation circuit is operable to calculate the energy value based on the sensor output.

Other embodiments of the present invention provide methods for contact detection. The methods include: receiving a sensor output; calculating an energy value of the sensor output; comparing the energy value with a threshold value to yield a comparison result; and asserting a contact indicator output based at least in part on the comparison result. In some cases, the methods further include: receiving a user performance input; and calculating the threshold value based at least in part on the user performance threshold. In various cases, the methods further include: calculating a mean of the sensor output; and calculating a variance of the sensor output. In some such cases, calculating the threshold value may be based at least in part on the user performance threshold and at least one of the mean and the variance.

Turning to FIG. 1, a storage system 100 including a read channel circuit 110 having energy based head touch down sensor circuitry in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

In addition to sensing data stored on disk platter 178, read/write head assembly 176 provides for sensing contact between read/write head assembly 176 and disk platter 178. Such sensing includes determining an energy level derived from a touch sensor, and using the energy level to determine whether the read/write head assembly 176 is contacting disk platter. In some cases, the sensor includes an ability to control a false detection threshold. In some cases, read channel circuit 110 is implemented similar to that disclosed in relation to FIG. 3a below and the energy based head touch down sensor circuitry may be implemented similar to that disclosed below in relation to FIG. 3b. Further, the systems may operate consistent with that discussed below in relation to FIG. 5.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
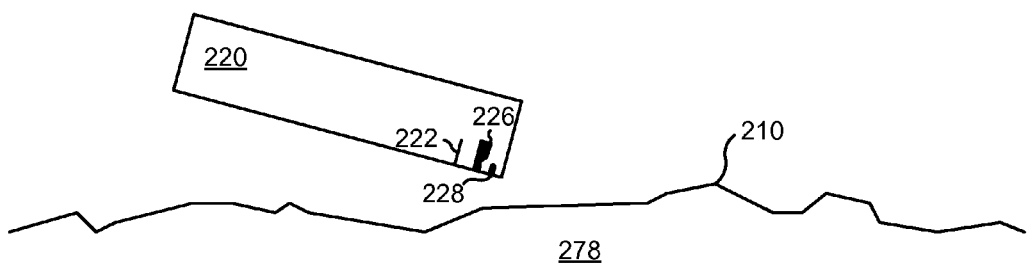
FIG. 2 graphically depicts an example read/write head disposed above the surface of a storage medium that may be used in relation to different embodiments of the present invention.

Turning to FIG. 2, a graphical depiction of an example read/write head assembly 220 disposed above a surface 210 of a storage medium 278 that may be used in relation to different embodiments of the present invention. As shown, read write head assembly 220 includes a heater element 222 that is operable to control a distance between read write head assembly 220 and surface 210, a read/write head 226 operable to generate magnetic fields to store information on surface 210 and to sense magnetic information previously stored on surface 210, and a head disk interface sensor 228 operable to sense contact between read/write head assembly 220 and surface 210.

Figure 3A:
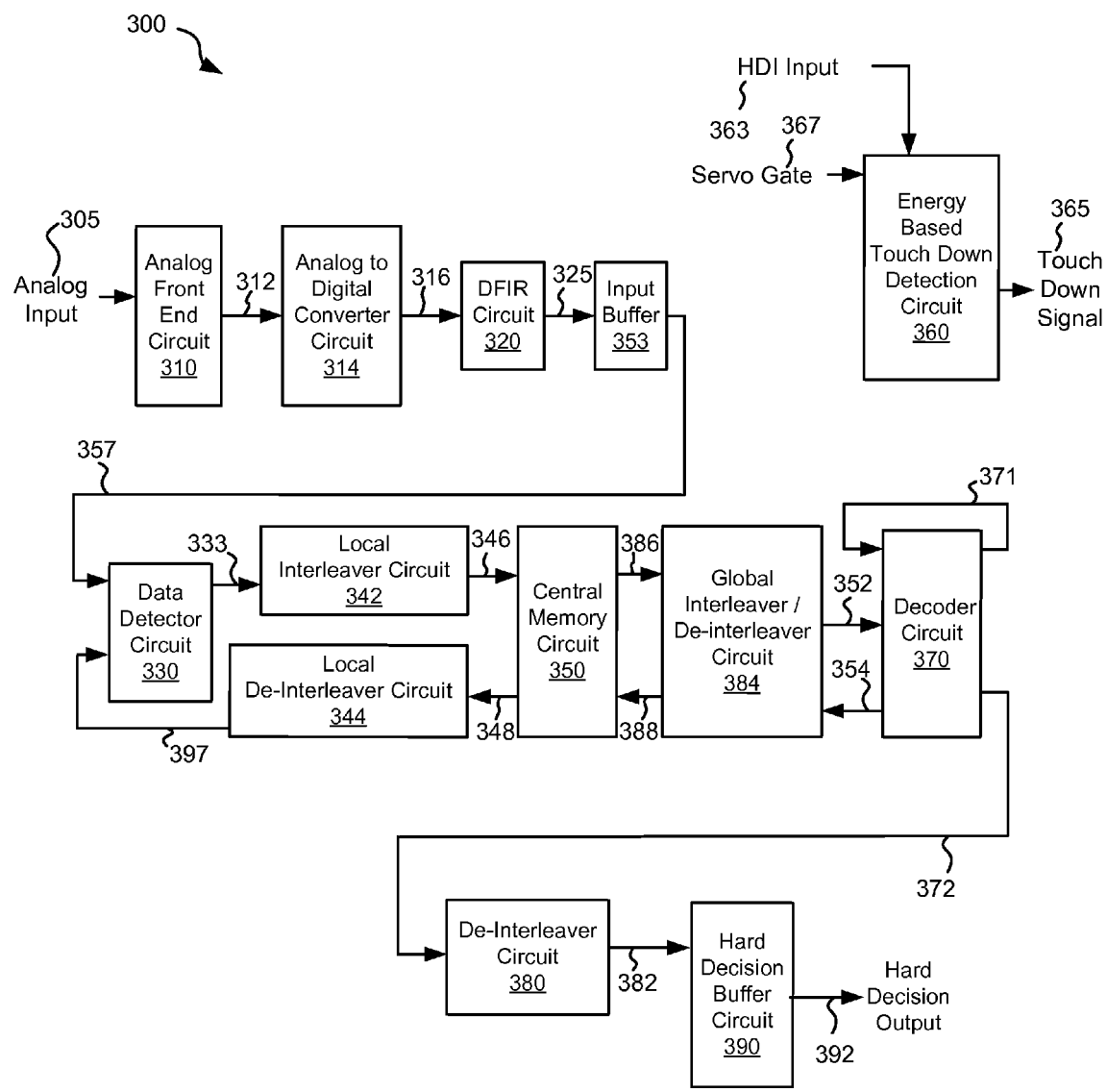
FIG. 3a shows a data processing circuit including an energy based touch down detection circuit in accordance with some embodiments of the present invention.

Turning to FIG. 3a, a data processing circuit 300 is shown that includes an energy based touch down detection circuit 360 in accordance with some embodiments of the present invention. Data processing circuit 300 includes an analog front end circuit 310 that receives an analog signal 305. Analog front end circuit 310 processes analog signal 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 305 is derived from a read/write head assembly (not shown) that is disposed in relation to a storage medium (not shown). In other cases, analog signal 305 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 305 may be derived.

Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 316 are provided to an equalizer circuit 320. Equalizer circuit 320 applies an equalization algorithm to digital samples 316 to yield an equalized output 325. In some embodiments of the present invention, equalizer circuit 320 is a digital finite impulse response filter circuit as are known in the art. It may be possible that equalized output 325 may be received directly from a storage device in, for example, a solid state storage system. In such cases, analog front end circuit 310, analog to digital converter circuit 314 and equalizer circuit 320 may be eliminated where the data is received as a digital data input. Equalized output 325 is stored to an input buffer 353 that includes sufficient memory to maintain a number of codewords until processing of that codeword is completed through a data detector circuit 330 and decoder circuit 370 including, where warranted, multiple global iterations (passes through both data detector circuit 330 and decoder circuit 370) and/or local iterations (passes through decoder circuit 370 during a given global iteration). An output 357 is provided to data detector circuit 330.

Data detector circuit 330 may be a single data detector circuit or may be two or more data detector circuits operating in parallel on different codewords. Whether it is a single data detector circuit or a number of data detector circuits operating in parallel, data detector circuit 330 is operable to apply a data detection algorithm to a received codeword or data set. In some embodiments of the present invention, data detector circuit 330 is a Viterbi algorithm data detector circuit as are known in the art. In other embodiments of the present invention, data detector circuit 330 is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 330 is used to apply the data detection algorithm to the received codeword for a first global iteration applied to the received codeword, and another data detector circuit included in data detector circuit 330 is operable apply the data detection algorithm to the received codeword guided by a decoded output accessed from a central memory circuit 350 on subsequent global iterations.

Upon completion of application of the data detection algorithm to the received codeword on the first global iteration, data detector circuit 330 provides a detector output 333. Detector output 333 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detector output 333 is provided to a local interleaver circuit 342. Local interleaver circuit 342 is operable to shuffle sub-portions (i.e., local chunks) of the data set included as detected output and provides an interleaved codeword 346 that is stored to central memory circuit 350. Interleaver circuit 342 may be any circuit known in the art that is capable of shuffling data sets to yield a re-arranged data set. Interleaved codeword 346 is stored to central memory circuit 350.

Once decoder circuit 370 is available, a previously stored interleaved codeword 346 is accessed from central memory circuit 350 as a stored codeword 386 and globally interleaved by a global interleaver/de-interleaver circuit 384. Global interleaver/de-interleaver circuit 384 may be any circuit known in the art that is capable of globally rearranging codewords. Global interleaver/De-interleaver circuit 384 provides a decoder input 352 into decoder circuit 370. In some embodiments of the present invention, the data decode algorithm is a layered low density parity check algorithm as are known in the art. In other embodiments of the present invention, the data decode algorithm is a non-layered low density parity check algorithm as are known in the art.

Where decoded output 371 fails to converge (i.e., fails to yield the originally written data set) and a number of local iterations through decoder circuit 370 exceeds a threshold, the resulting decoded output is provided as a decoded output 354 back to central memory circuit 350 where it is stored awaiting another global iteration through a data detector circuit included in data detector circuit 330. Prior to storage of decoded output 354 to central memory circuit 350, decoded output 354 is globally de-interleaved to yield a globally de-interleaved output 388 that is stored to central memory circuit 350. The global de-interleaving reverses the global interleaving earlier applied to stored codeword 386 to yield decoder input 352. When a data detector circuit included in data detector circuit 330 becomes available, a previously stored de-interleaved output 388 is accessed from central memory circuit 350 and locally de-interleaved by a de-interleaver circuit 344. De-interleaver circuit 344 re-arranges decoder output 348 to reverse the shuffling originally performed by interleaver circuit 342. A resulting de-interleaved output 397 is provided to data detector circuit 330 where it is used to guide subsequent detection of a corresponding data set previously received as equalized output 325.

Alternatively, where the decoded output converges (i.e., yields the originally written data set), the resulting decoded output is provided as an output codeword 372 to a de-interleaver circuit 380 that rearranges the data to reverse both the global and local interleaving applied to the data to yield a de-interleaved output 382. De-interleaved output 382 is provided to a hard decision buffer circuit 390 that arranges the received codeword along with other previously received codewords in an order expected by a requesting host processor. The resulting output is provided as a hard decision output 392.

Decoder circuit 370 is designed to accept codewords that are not constrained by a '1' symbol in the final circulant in the codeword. This is facilitated by using a standard non-binary, low density parity check decoder circuit that is augmented to include an inverse mapping circuit to adjust a soft data output to compensate for the non-constrained circulant. Such an approach utilizes only a relatively small amount of additional circuitry, but results in an increased distance between possible accepted decoded outputs thereby reducing the likelihood of a mis-correction. One example implementation of decoder circuit 370 is described below in relation to FIG. 4 below.

In addition, data processing circuit 300 includes energy based touch down detection circuit 360 that is operable to assert a touch down signal 365 when contact between a read/write head assembly and a storage medium is sensed. Energy based touch down detection circuit 360 receives a head/disk interface ("HDI") input 363 that represents a temperature of a read/write head assembly. When a read/write head assembly contacts a storage medium, there is a dramatic increase in temperature of the read/write head assembly that causes a corresponding dramatic change in HDI input 363.

Turning to FIGS. 4a-4d, HDI input corresponding to four different contact scenarios are shown. First, in FIG. 4a, a normal or non-contact scenario is shown including a servo region 406 and a data region 403. The HDI input during data region 403 is used to determine contact. As shown, the amplitude of the HDI input during data region 403 is relatively low and substantially constant. Second, in FIG. 4b, a slight contact scenario is shown including a servo region 416 and a data region 413. In the slight contact scenario, there is a significant increase in the energy of the HDI input. Third, in FIG. 4c, an intermittent contact scenario is shown including a servo region 426 and a data region 423. As with the slight contact scenario, there is a significant increase in the energy of the HDI input. Fourth, in FIG. 4d, a full contact scenario is shown including a servo region 436 and a data region 433. As with the slight contact scenario and the intermittent contact scenario, there is a significant increase in the energy of the HDI input.

Returning to FIG. 3a, energy based touch down detection circuit 360 calculates an energy of the HDI input 363 during a data region. The data region is indicated when a servo gate 367 is asserted low. In addition, energy based touch down detection circuit 360 calculates an energy threshold to which the energy of HDI input 363 is compared. Where the energy of HDI input 363 is greater than the calculated energy threshold, touch down signal 365 is asserted indicating contact between the read/write head assembly and the storage medium. Otherwise, where HDI input 363 is less than the calculated energy threshold, touch down signal 365 is not asserted.

Figure 3B:
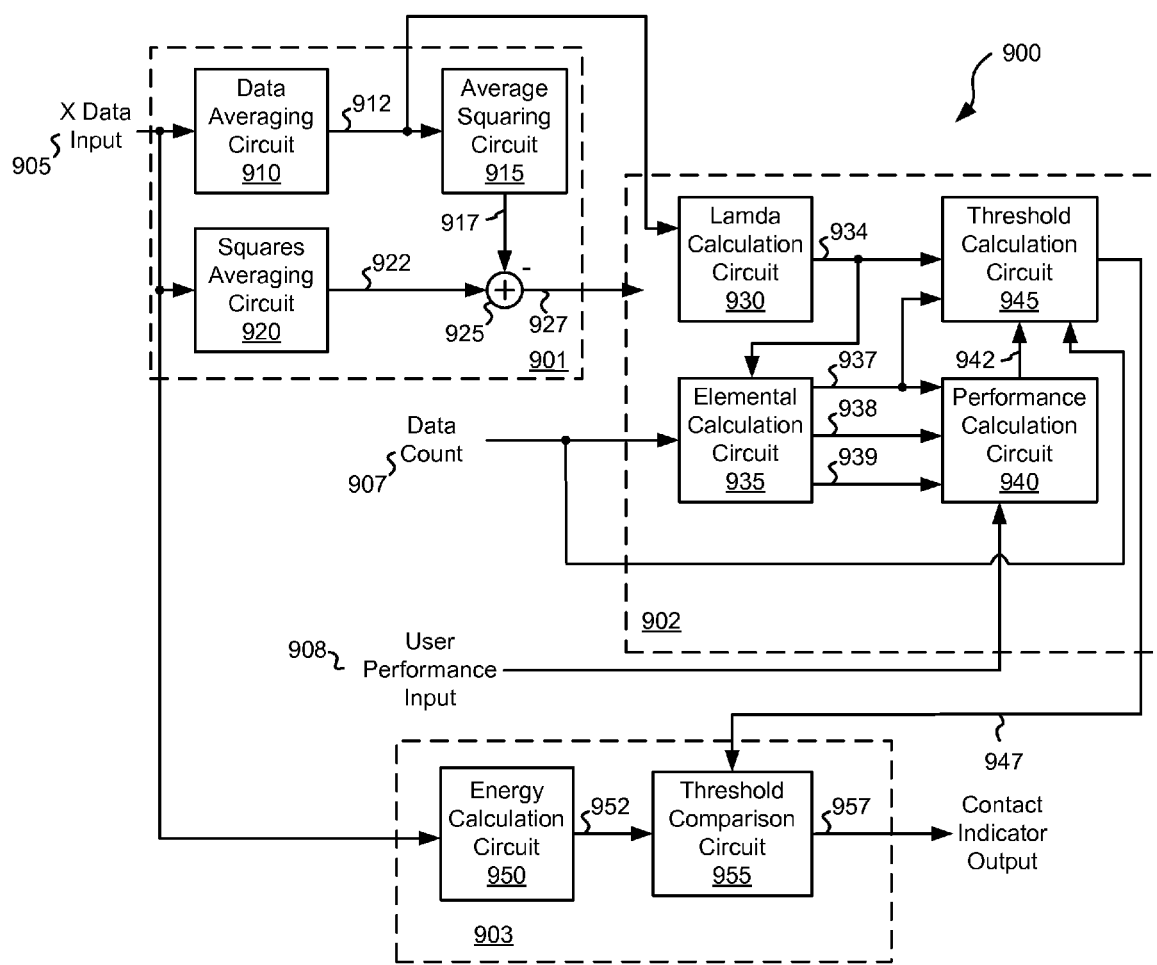
FIG. 3b shows an implementation of the energy based touch down detection circuit in accordance with various embodiments of the present invention.

Turning to FIG. 3b, one implementation of energy based touch down detection circuit 360 of FIG. 3a is shown in accordance with various embodiments of the present invention. An energy based touch down detection circuit 900 is shown that includes a parameter training circuit 901 that is operable to calculate a mean ($\mu$) and variance ($\sigma^2$) of an X-data input 905, a threshold determination circuit 902 that is operable to calculate an energy threshold indicative of contact between a read/write head assembly and a storage medium, and a touch down detection circuit 903 operable to indicate touch down based upon comparison with the energy threshold.

Training data is X-data input 905 from the HDI sensor which is generated at a time when the read/write head assembly is disposed a distance from the storage medium that guarantees that no contact occurs. Parameter training is performed by parameter training circuit 901 using X-data input 905. Using test data, the signal from the HDI sensor is zero or very small (e.g., FIG. 4a). Using this condition, the training data (X-data input 905) can be represented as:

$$x = [x_1, x_2, x_3, \ldots x_N]^T$$

From this, the likelihood function of the mean and variance of X-data input 905 may be written as:

$$f(x|\mu, \sigma^2) = \prod_{i=1}^{N} \frac{1}{\sqrt{2\pi\sigma^2}} e^{-\left(\frac{X-data\ Input\ 905}{2\sigma^2}\right)}.$$

Thus, the maximum likelihood estimate of mean $\mu$ and variance $\sigma^2$ can be obtained via the following equations:

$$\{\hat{\mu}, \hat{\sigma}^2\} = \mathrm{argmax}_{\mu,\sigma^2}\, f(x\mid \mu, \sigma^2),\ \text{and}$$

$$\{\hat{\mu}, \hat{\sigma}^2\} = \mathrm{argmax}_{\mu,\sigma^2}\, \underbrace{\log f(x\mid \mu, \sigma^2)}_{\triangleq g(\mu,\sigma^2)}.$$

Form this, the following equations are solved:

$$\frac{\partial (\mu, \sigma^2)}{\partial \mu} = 0,\ \text{and}$$

$$\frac{\partial (\mu, \sigma^2)}{\partial \sigma^2} = 0.$$

The solution yields the final equations for the mean and the variance:

$$\mu = \frac{1}{N}\sum_{i=1}^{N} X - \text{Data Input 905, and}$$

$$\sigma^2 = \frac{1}{N}\sum_{i=1}^{N} (X - \text{Data Input 905})^2 - \mu^2.$$

Using the aforementioned equations for mean and variance, parameter training circuit 901 includes a data averaging circuit 910, a squares averaging circuit 920, an average squaring circuit 915, and a summation circuit 925. Data averaging circuit 910 calculates a mean ($\mu$ 912) of X-data input 905 in accordance with the following equation:

$$\mu 912 = \frac{1}{N}\sum_{i=1}^{N} X - \text{Data Input 905}.$$

Mean 912 is provided to average squaring circuit 915 where it is squared to yield a squared output ($\mu^2$ 917). Squares averaging circuit 920 calculates an average of squared X-data input 905 (r 922) in accordance with the following equation:

$$r922 = \frac{1}{N}\sum_{i=1}^{N} (X - \text{Data Input 905})^2.$$

Summation circuit subtracts $\mu^2$ 917 from r 922 to yield a variance 927 ($\sigma^2$ 927).

Variance 927 and mean 912 are provided to threshold determination circuit 902. Threshold determination circuit 902 performs threshold determination using variance 927 and mean 912 from parameter training circuit 901, a data count 907, and a user performance input 908. Test data is X-data input 905 from the HDI sensor which is generated at a time when the read/write head assembly is not guaranteed not to be contacting the storage medium. Threshold calculation is performed by threshold determination circuit 902 using X-data input 905. The test data (X-data input 905) can be represented as:

$$y = [y_1, y_2, y_3, \ldots y_N]^M.$$

Where such is the case, an energy detector may be mathematically recast as:

$$y^T y = \sum_{i=1}^{M} y_i^2 \underset{H_0}{\overset{H_1}{\gtrless}} T,$$

where T is the threshold value, 117 is the touch down condition, and $H_0$ is the normal, non-touch down condition. By defining $$z_i = \frac{y_i}{\sigma}\ \text{and}\ T_i = \frac{T}{\sigma^2},$$

then the preceding equation can be re-written as:

$$h(z) = \sum_{i=1}^{M} z_i^2 \underset{H_0}{\overset{H_1}{\gtrless}} T_1.$$

Since $y_i$ follows the Gaussian distribution with mean $\mu$ and variance $\sigma^2$ under the null hypothesis $H_0$, $Z_i$ is Gaussian random variable with unit variance and mean $\mu$. As a result, the test statistics h(z) will follow the non-central chi-squared distribution.

A false alarm occurs when a touch down condition is indicated without contact between the read/write head assembly and the storage medium. As such, a false alarm may be mathematically represented as:

$$\{h(z)\mid H_0 > T_1\}.$$

Using this, the probability ($P_f$) of the false alarm rate may be mathematically represented as follows:

$$P_f = e^{-\frac{\lambda}{2}} \sum_{j=1}^{\infty} \frac{(\lambda/2)^j}{j!} Q(T_i, M+2j),$$

where $Q(T_i, k)$ is the cumulative distribution function of the central chi-squared distribution with k degrees of freedom, and $\lambda = M(\mu/\sigma^2)$. The user provides the probability ($P_f$) as user performance input 908. This user provided probability may be approximated as:

$$P_f = \Phi\left(\frac{\left(\frac{T_1}{M+\lambda}\right)^h - [1 + hp(h-1-0.5(2-h)mp)]}{h\sqrt{2p}\,(1+0.5mp)}\right),$$

where $\Phi$ is the cumulative distribution function of the standard normal distribution, $$h = 1 - \frac{2}{3}\frac{(M+\lambda)(M+2\lambda)}{(M+2\lambda)^2},$$

$$p = \frac{(M+2\lambda)}{(M+\lambda)^2},\ \text{and}\ m = (h-1)(1-3h).$$

Of note, each of h, p and m do not depend upon threshold $T_1$, and they can be precalculated for a given data length of the test data. By expressing the function of probability ($f(P_f)$) as:

$$f(P_f) = h\sqrt{2p}(1+0.5mp)\Phi^{-1}(Pf) + [1 + hp(h-1-0.5(2-h)mp)],$$

the threshold can be mathematically recast as:

$$T_1 = \sqrt[h]{f(P_f)}\,(M + \lambda).$$

Thus, the threshold is calculated based upon user performance input 908.

Threshold determination circuit 902 includes a lambda calculation circuit 930, an elemental calculation circuit 935, a threshold calculation circuit 945, and a performance calculation circuit 940. Lamda calculation circuit 930 computes the value of λ based upon the product of variance 927 and mean 912 ($\mu\sigma^2$). In particular, the value of λ is calculated in accordance with the following equation:

$$\lambda = M(\mu/\sigma^2)^2.$$

where M is the data count 907 (i.e., the number of values used in calculating variance 927 and mean 912), μ is the mean, and $\sigma^2$ is the variance. The calculated value is provided as a lambda output 934 to threshold calculation circuit 945 and elemental calculation circuit 935.

Elemental calculation circuit 935 calculates the values of h, p and m based upon lambda output 934 in accordance with the following equations:

$$h937 = 1 - \frac{2}{3}\frac{(M + \lambda 934)(M + 2(\lambda 934))}{(M + 2(\lambda 934))^2},$$

$$p938 = \frac{(M + 2(\lambda 934))}{(M + (\lambda 934))^2},\text{ and}$$

$$m939 = ((h937) - 1)(1 - 3(h937)).$$

M is the data count 907 (i.e., the number of values used in calculating variance 927 and mean 912). h 937, p 938 and m 939 are provided to performance calculation circuit 940.

Performance calculation circuit 940 calculates $f(P_f)$ based upon user performance input 908, h 937, p 938 and m 939 in accordance with the following equation:

$$f(P_f) = (h937)\sqrt{2(p938)}(1+0.5(m939)(p938)\Phi^{-1}(Pf) + [1+(h937)(p938)[(h937)-1-0.5(2-(h937)](m939)(p938)]$$

The calculated value is provided as a performance output 942.

Threshold calculation circuit 945 calculates a threshold output 947 based upon performance output 942 and lambda output 934 in accordance with the following equation:

Threshold Output 947 =

$$\sqrt[h]{\text{performance output 942}}\,(\text{data count 907} + \text{Lambda 934}).$$

Threshold output 947 is provided to touch down detection circuit 903.

Touch down detection circuit 903 includes an energy calculation circuit 950 and a threshold comparison circuit 955. Energy calculation circuit 950 calculates an energy in X-data input 905 to yield an energy output 952 (h(z)) in accordance with the following equation:

$$\text{Energy Output 952} = \sum_{i=1}^{M}(X - \text{Data Input 905})^2.$$

Energy output 952 is provided to threshold comparison circuit 955 where it is compared with threshold output 947. Where energy output 952 is greater than or equal to threshold output 947, threshold comparison circuit 947 asserts a contact indicator output 957 to indicate a touch down occurred.

Figure 5:
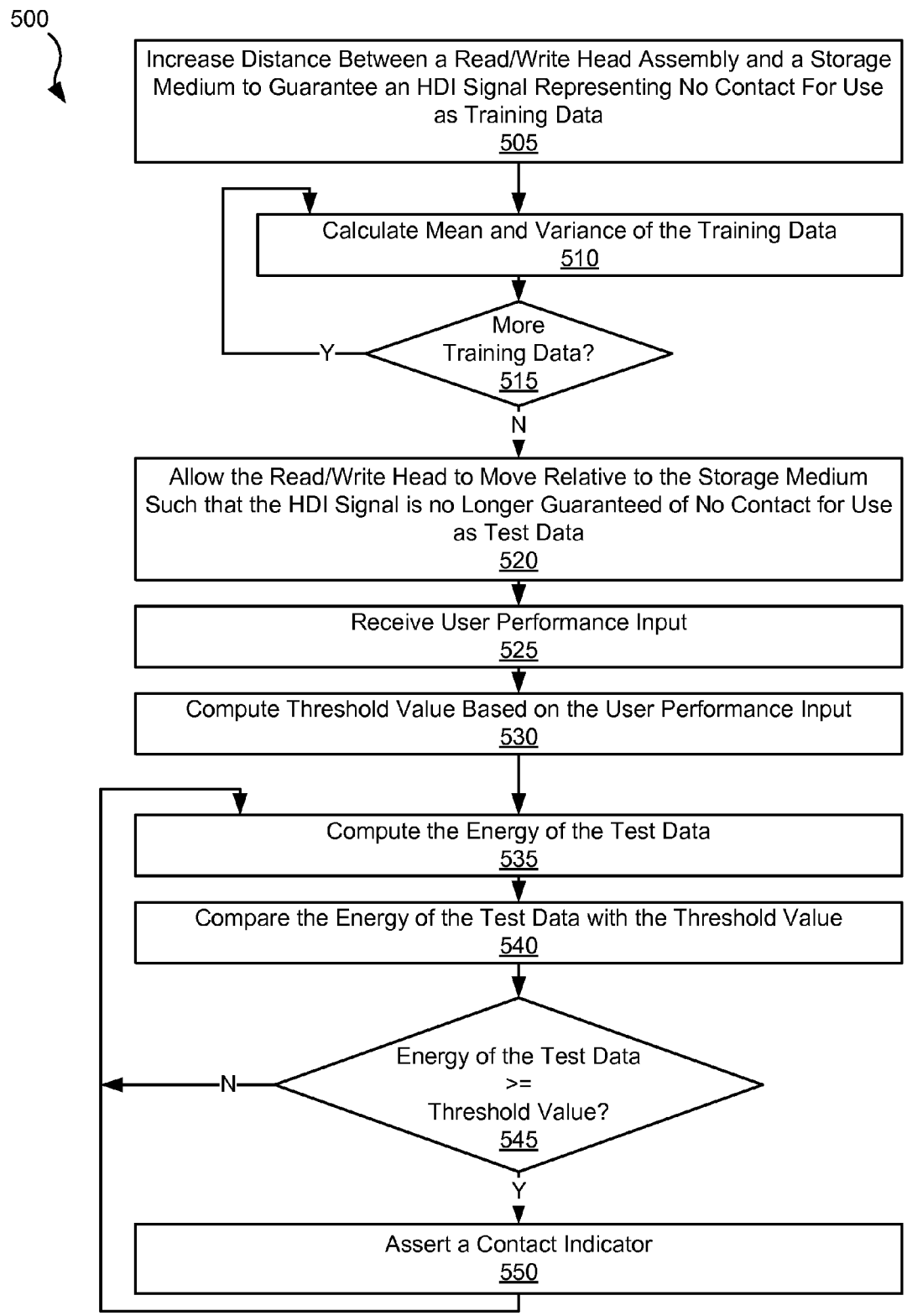
FIG. 5 is a flow diagram showing a method for contact detection in accordance with some embodiments of the present invention.

Turning to FIG. 5, a flow diagram 500 shows a method for contact detection in accordance with some embodiments of the present invention. Following flow diagram 500, a distance between a read/write head assembly and a storage medium is increased to an extent that no contact between the two will occur (block 505). This results in a situation where the signal received from a head disk interface is zero or small. Such data is referred to as training data as its constant nature lends itself for training parameters. A mean (μ) and variance ($\sigma^2$) of the signal from the head disk interface is calculated using the training data (block 510). In particular, the mean and variance are calculated in accordance with the following equations:

$$\mu = \frac{1}{N}\sum_{i=1}^{N} HDI\ \text{Signal}\ (i), \text{ and}$$

$$\sigma^2 = \frac{1}{N}\sum_{i=1}^{N}(HDI\ \text{Signal}\ (i))^2 - \mu^2.$$

It is determined whether additional instances of the HDI signal are to be used in the training process (block 515). Where more data remains to be included (block 515), the processes of block 510 is repeated to include the additional information.

Otherwise, where no more data remains to be included (block 515), the training process is complete, and the read/write head assembly is allowed to move relative to the storage medium such that the previous no-contact condition can no longer be guaranteed (block 520). The signal from the head disk interface during this period is referred to as test data. A user performance input is received (block 525). The user performance input is a threshold of false detection that may be programmed by the user. A threshold value is computed based upon the received user performance input (block 530). The threshold value is calculated based upon a performance value that is calculated in accordance with the following equation:

$$f(P_f) = h\sqrt{2p}\,(1+0.5mp)\Phi^{-1}(Pf) + [1+hp[h-1-0.5(2-h)]mp],$$

where:

$$h = 1 - \frac{2}{3}\frac{(M + \lambda)(M + 2\lambda)}{(M + 2\lambda)^2},$$

$$p = \frac{(M + 2\lambda)}{(M + \lambda)^2},\text{ and}$$

$$m = (h - 1)(1 - 3h).$$

M is the number of values used in calculating the variance and the mean. From this, the threshold value is calculated in accordance with the following equation:

$$\text{Threshold Value} = \sqrt[h]{f(P_f)}\,(M+\lambda).$$

The energy of the test data is calculated (block 535). In particular, the energy is calculated in accordance with the following equation:

$$\text{Energy} = \sum_{i=1}^{M} (HDI\ \text{Signal}\ (i))^2.$$

The energy value is then compared with the previously calculated threshold value (block 540). Where the energy of the test data is greater than or equal to the threshold value (block 545), a contact indicator is asserted to indicate contact between the read/write head assembly and the storage medium (block 550).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A storage device, the storage device comprising:
   a storage medium;
   a read/write head assembly disposed in relation to the storage medium, wherein the read/write head assembly includes a sensor operable to provide a sensor output indicating contact between the read/write head assembly and the storage medium, wherein the sensor output includes a first temperature at a first time and a second temperature at a second time, wherein the first time is subsequent to the second time, and wherein the same sensor provides both the first temperature at the first time and the second temperature at the second time; and
   a touch down detection circuit operable to calculate an energy value of only the first temperature at the first time apart from the second temperature and compare the energy value with a threshold value to yield a contact output.

2. The storage device of claim 1, wherein the sensor is a thermal sensor, and wherein the first temperature at the first time is a temperature of the thermal sensor.

3. The storage device of claim 1, wherein the touch down detection circuit comprises:
   a threshold determination circuit operable to receive a user performance input, and to calculate the threshold value based at least in part on the user performance input.

4. The storage device of claim 1, wherein the touch down detection circuit comprises:
   a training circuit operable to calculate a mean and a variance of the sensor output.

5. The storage device of claim 4, wherein the training circuit comprises:
   a data averaging circuit operable to average multiple instances of the sensor output to yield the mean;
   a squares averaging circuit operable to average multiple instances of the sensor output squared to yield an interim value;
   an average squaring circuit operable to square the mean to yield a squared mean; and
   a summation circuit operable to subtract the squared mean from the interim value to yield the variance.

6. The storage device of claim 4, wherein the touch down detection circuit comprises:
   a threshold determination circuit operable to calculate the threshold value based at least in part on the mean and the variance.

7. The storage device of claim 6, wherein the threshold determination circuit is further operable to receive a user performance input, and to calculate the threshold based at least in part on the user performance input.

8. The storage device of claim 1, wherein the touch down detection circuit comprises:
   an energy calculation circuit operable to calculate the energy value based on the sensor output.

9. The storage device of claim 1, wherein the touch down detection circuit is implemented as part of a semiconductor device.

10. The storage device of claim 1, wherein the storage device is a hard disk drive.

11. A method for contact detection, the method comprising:
    receiving a sensor output, wherein the sensor output includes a first temperature at a first time and a second temperature at a second time, wherein the first time is subsequent to the second time, and wherein a single sensor provides both the first temperature at the first time and the second temperature at the second time;
    calculating an energy value of the first temperature at the first time without using the second temperature;
    comparing the energy value with a threshold value to yield a comparison result; and
    asserting a contact indicator output based at least in part on the comparison result.

12. The method of claim 11, the method further comprising:
    receiving a user performance input; and
    calculating the threshold value based at least in part on the user performance input.

13. The method of claim 11, the method further comprising:
    calculating a mean of the sensor output; and
    calculating a variance of the sensor output.

14. The method of claim 13, the method further comprising:

receiving a user performance input; and
calculating the threshold value based at least in part on the user performance input and at least one of the mean and the variance.

15. A contact detection system, the system comprising:
a touch down detection circuit operable to:
   receive a sensor output, wherein the sensor output includes a first temperature at a first time and a second temperature at a second time, wherein the first time is subsequent to the second time, and wherein a single sensor provides both the first temperature at the first time and the second temperature at the second time;
   calculate an energy value of the first temperature at the first time without using the second temperature; and
   assert a contact indicator output based at least in part on a comparison of the energy value with a threshold value.

16. The contact detection system of claim 15, wherein the contact detection system is implemented as part of a semiconductor device.

17. The contact detection system of claim 15, wherein the contact detection system is implemented as part of a storage device, and wherein the storage device further comprises:
   a storage medium; and
   a read/write head assembly disposed in relation to the storage medium, wherein the read/write head assembly includes a sensor operable to provide the sensor output indicating contact between the read/write head assembly and the storage medium.

18. The contact detection system of claim 15, wherein the touch down detection circuit comprises:
   a threshold determination circuit operable to receive a user performance input, and to calculate the threshold value based at least in part on the user performance input.

19. The contact detection system of claim 15, wherein the touch down detection circuit comprises:
   a threshold determination circuit operable to calculate the threshold value based at least in part on a mean of the sensor output and a variance of the sensor output.

20. The contact detection system of claim 15, wherein the touch down detection circuit comprises:
   a threshold determination circuit operable to receive a user performance input, and to calculate the threshold value based at least in part on the user performance input, and at least one of a mean of the sensor output and a variance of the sensor output.

* * * * *